US010979673B2

(12) United States Patent
Black et al.

(10) Patent No.: US 10,979,673 B2
(45) Date of Patent: Apr. 13, 2021

(54) INVENTORY MANAGEMENT AND MONITORING

(71) Applicant: Cuica LLC, Plano, TX (US)

(72) Inventors: Alistair Black, Los Gatos, CA (US); Ashitosh Swarup, Burbank, CA (US)

(73) Assignee: DEEP NORTH, INC., Foster City, CA (US)

( * ) Notice: Subject to any disclaimer, the term of this patent is extended or adjusted under 35 U.S.C. 154(b) by 259 days.

(21) Appl. No.: 15/353,585

(22) Filed: Nov. 16, 2016

(65) Prior Publication Data

US 2017/0142373 A1 May 18, 2017

Related U.S. Application Data

(60) Provisional application No. 62/255,818, filed on Nov. 16, 2015.

(51) Int. Cl.
*H04N 7/18* (2006.01)
*G06Q 10/08* (2012.01)
*H04W 64/00* (2009.01)
*H04L 12/24* (2006.01)

(52) U.S. Cl.
CPC ........... *H04N 7/181* (2013.01); *G06Q 10/087* (2013.01); *H04W 64/00* (2013.01); *H04L 41/044* (2013.01); *H04L 41/12* (2013.01)

(58) Field of Classification Search
CPC ...... G06Q 10/087; H04L 41/12; H04N 7/181; H04W 64/00
See application file for complete search history.

(56) References Cited

U.S. PATENT DOCUMENTS

| | | | | |
|---|---|---|---|---|
| 4,766,590 A | * | 8/1988 | Hamada | H04L 12/42 370/407 |
| 5,406,322 A | * | 4/1995 | Port | H04L 12/1877 348/14.07 |
| 6,670,933 B1 | * | 12/2003 | Yamazaki | G06F 3/1454 345/1.1 |
| 7,016,899 B1 | * | 3/2006 | Stern | G06F 17/30241 |
| 7,106,361 B2 | * | 9/2006 | Kanade | G03B 41/00 348/143 |
| 7,231,359 B2 | * | 6/2007 | Parulski | G06Q 30/0601 705/26.41 |
| 7,769,221 B1 | | 8/2010 | Shakes et al. | |

(Continued)

OTHER PUBLICATIONS

Collins et al.; A System for Video Surveillance and Monitoring; 2000; Carnegie Mellon University; CMU-RI-TR-00-12; pp. 1-69.*

*Primary Examiner* — Peter D Le

(74) *Attorney, Agent, or Firm* — David R. Stevens; Stevens Law Group

(57) ABSTRACT

Example inventory management and monitoring systems are described. In one implementation, an inventory management system includes a computing system that receives multiple images captured by multiple imaging devices wirelessly coupled to the computing system. The computing system also receives a spatial location of each imaging device as determined by a device positioning system. The computing system is configured to determine a spatial location of an object in each of the multiple images and monitor the objects in the images to determine changes in the location of the objects.

19 Claims, 13 Drawing Sheets

(56) References Cited

U.S. PATENT DOCUMENTS

| | | | |
|---|---|---|---|
| 2002/0118969 A1* | 8/2002 | Kanade | G03B 41/00 396/322 |
| 2003/0113038 A1* | 6/2003 | Spencer | G06Q 10/107 382/305 |
| 2004/0183915 A1* | 9/2004 | Gotohda | H04N 5/232 348/207.11 |
| 2004/0223466 A1* | 11/2004 | Schrader | H04J 3/1605 370/321 |
| 2005/0169201 A1* | 8/2005 | Huylebroeck | H04W 74/06 370/311 |
| 2005/0256903 A1* | 11/2005 | Van De Sluis | H04L 12/2803 |
| 2006/0087411 A1* | 4/2006 | Chang | B60R 25/102 340/426.18 |
| 2007/0188626 A1* | 8/2007 | Squilla | G06T 5/001 348/222.1 |
| 2008/0021953 A1* | 1/2008 | Gil | G06F 17/30876 709/203 |
| 2008/0084473 A1* | 4/2008 | Romanowich | G08B 13/19671 348/135 |
| 2008/0192129 A1* | 8/2008 | Walker | G11B 27/034 348/231.2 |
| 2008/0215460 A1 | 9/2008 | McKibben | |
| 2009/0028440 A1* | 1/2009 | Elangovan | G06K 9/6202 382/216 |
| 2009/0059270 A1 | 3/2009 | Opalach et al. | |
| 2010/0013666 A1* | 1/2010 | Merino Panades | G01D 4/008 340/870.02 |
| 2010/0149331 A1* | 6/2010 | DiMare | G11B 27/034 348/143 |
| 2011/0069179 A1* | 3/2011 | Bathiche | H04N 5/23206 348/207.1 |
| 2011/0109726 A1* | 5/2011 | Hwang | H04N 13/243 348/243 |
| 2012/0029399 A1* | 2/2012 | Sankai | A61B 5/04888 601/40 |
| 2013/0166193 A1* | 6/2013 | Goldman | G01C 21/206 701/410 |
| 2013/0210563 A1* | 8/2013 | Hollinger | H04N 5/2252 473/570 |
| 2014/0152507 A1 | 6/2014 | Mcallister | |
| 2014/0152809 A1* | 6/2014 | Jarvis | H04N 7/18 348/135 |
| 2014/0344118 A1* | 11/2014 | Parpia | G06Q 10/087 705/28 |
| 2014/0378853 A1* | 12/2014 | McKinney | A61B 5/02438 600/509 |
| 2015/0146921 A1* | 5/2015 | Ono | H04N 7/18 382/103 |
| 2016/0335917 A1* | 11/2016 | Lydecker | G09B 21/008 |

* cited by examiner

INVENTORY MANAGEMENT AND MONITORING

RELATED APPLICATION

This application claims the priority benefit of U.S. Provisional Application Ser. No. 62/255,818, entitled "Monitoring Network", filed Nov. 16, 2015, the disclosure of which is incorporated by reference herein in its entirety.

TECHNICAL FIELD

The present disclosure relates to systems and methods that implement, for example, a wirelessly-networked in-store camera system that features a capability for real-time inventory monitoring and providing an indoor positioning system for a user of a mobile device.

BACKGROUND

Inventory monitoring is an important task in the retail environment. In a brick-and-mortar store, keeping stock of inventory items is an ongoing process. Furthermore, a customer may pick up an item from its stocked location, only to later change their mind and leave the item at another location. There exists a need, therefore, for a system that is able to monitor in real-time the inventory on different shelves in a store, while being able to provide real-time stock alerts when an item is out of stock or nearly out of stock, or alerting store personnel when an item is displaced from its correct location.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1A:
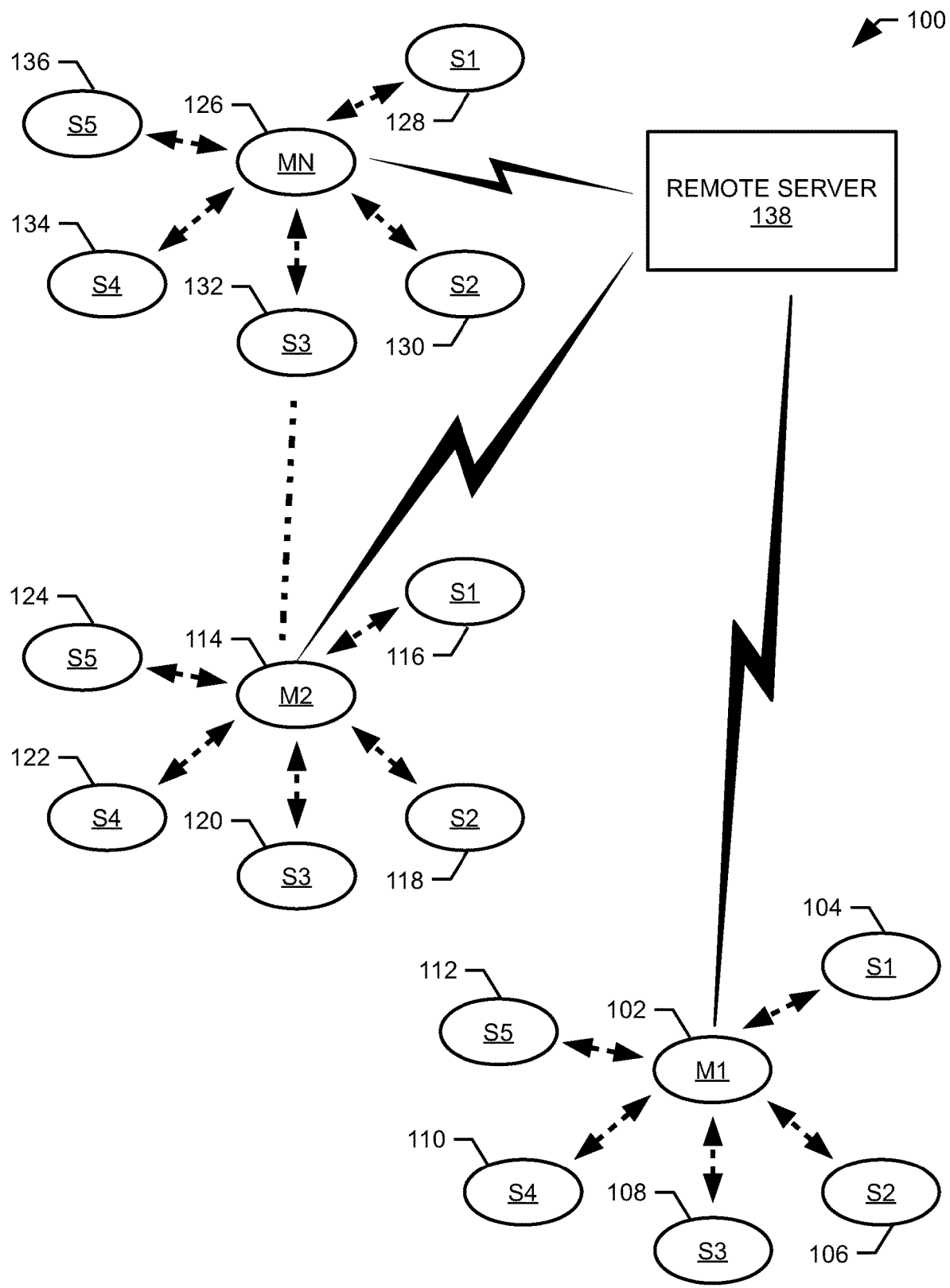
FIG. 1A is a block diagram depicting an embodiment of an inventory management system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein support an inventory management system that may be implemented in a retail environment such as department stores. In one embodiment, a wirelessly networked system of low-powered imaging devices, such as cameras, is wirelessly coupled to a remote server. The imaging devices may be mounted on shelves or other structures in the retail environment, and may be positioned such that one or more objects are in the field-of-view captured by that imaging device. Each imaging device may be configured to capture an image of the one or more objects in its field of view and wirelessly transmit the image to the remote server either directly or indirectly via a relay device. The remote server receives one or more images from each imaging device and processes the images to monitor the position and take an inventory of the objects in the images.

FIG. 1A is a block diagram depicting an embodiment 100 of an inventory management system. In some embodiments, an imaging device M1 functioning as a master device (hereafter referred to as "master imaging device") 102 is wirelessly coupled to each of a slave imaging device S1 104, a slave imaging device S2 106, a slave imaging device S3 108, a slave imaging device S4 110, and a slave imaging device S5 112. Each of master imaging device M1 102, slave imaging device S1 104, slave imaging device S2 106, slave imaging device S3 108, slave imaging device S4 110 and slave imaging device S5 112 are configured to capture an image of one or more objects in their respective fields-of-view, and may be implemented by using, for example, camera systems. In some embodiments, master imaging device M1 102 is wirelessly coupled to a remote server 138. Typically, remote server 138 may be at a greater physical distance from the imaging devices as compared the physical distances between the imaging devices themselves.

Normally, slave imaging device S1 104 through slave imaging device S5 112 may be in sleep mode, where the term "sleep mode" is used to denote a low-power state, where the corresponding slave imaging device consumes very little power. Upon receiving a command from master imaging device M1 102, a slave imaging device such as slave imaging device S1 104 enters "wake" mode with greater functionality, captures an image of one or more objects in its field-of-view, wirelessly transmits the image to master imaging device M1 102, and returns back into sleep mode. Master imaging device M1 102 may successively poll all slave devices wirelessly coupled to master imaging device M1 102, from slave imaging device S1 104 through slave imaging device S5 112, and receive the images captured by each slave imaging device. Each slave device, when polled or pinged by master imaging device M1 102, enters a wake state, captures an image of one or more objects in its field-of-view, transmits the image to master imaging device M1 102, and returns to sleep mode. In some embodiments, master imaging device M1 102 may poll the slave imaging devices in a round-robin fashion, starting from slave imaging device S1 104 through slave imaging device S5 112. Master imaging device M1 102 may also capture an image of one or more objects in its own field-of-view, and then wirelessly transmit this image and all the images received from the slave imaging devices wirelessly coupled to it, to remote server 138.

In some embodiments, remote server 138 receives the images from master imaging device M1 102, and processes these images to determine the position and location of the corresponding items captured by the images. Using image processing techniques such as correlation and optical flow, remote server 138 can determine whether the position of an object in the image has changed from a default position, whether the object has been moved to a different position, whether an object from another position has been placed in the position captured by the image or, in the case of inventory management, whether an item or group of items on a retail shelf is out of stock. Out-of-stock alerts can be used to notify store personnel accordingly, and the items can be replenished. Similarly, misplaced items can be identified and store personnel can be prompted to return them back to their default positions.

As seen in FIG. 1A, inventory management system may include several clusters comprising a master imaging device wirelessly coupled to one or more slave imaging devices, where the associated master imaging device is wirelessly coupled to remote server 138. The example of master imaging device M1 102 and associated slave imaging devices S2 104 through S5 112 have been discussed above. FIG. 1A also shows identical clusters that include a master imaging device M2 114 wirelessly coupled to a slave imaging device S1 116, a slave imaging device S2, 118, a slave imaging device S3 120, a slave imaging device S4 122 and a slave imaging device S5 124, with master imaging device M2 114 being wirelessly coupled to remote server 138. This structure can be replicated on a large scale, with similar structures implemented beyond the imaging device clusters associated with master imaging device M1 102 and master imaging device M2 114, through a master imaging device MN 126 wirelessly coupled to a slave imaging device S1 128, a slave imaging device S2 130, a slave imaging device S3 132, a slave imaging device S4 134 and a slave imaging device S5 136, with master imaging device MN 126 being wirelessly coupled to remote server 138. A master imaging device is responsible for timing and sequencing all sleep/wake and data throughput operations for all the slave imaging devices under its control.

In some embodiments, the wireless coupling between a master imaging device and a slave imaging device may be accomplished by using wireless networking protocols such as ZigBee (IEEE 802.15.4). ZigBee supports ad-hoc networking, while also providing unique node identifications that allow each master imaging device and each slave imaging device to have a unique node identification code. ZigBee also supports different network topologies such as a star topology (shown in FIG. 1A) or a ring topology (discussed subsequently). Furthermore, ZigBee also supports low-power sleep modes, with sleep/wake cycles being implementable on the ZigBee protocol. Other networking protocols such as Bluetooth may also be used to realize the wireless communication link between a master imaging device and a slave imaging device.

In other embodiments, a master imaging device may be wirelessly coupled to remote server 138 via a wireless networking protocol such as Wi-Fi (IEEE 802.11). Wireless links implemented using Wi-Fi allows high-rate, high-bandwidth data transfers to be made. This is important given the fact that a master imaging device may have to transfer images from several slave devices to remote server 138 via the wireless communication link.

Figure 1B:
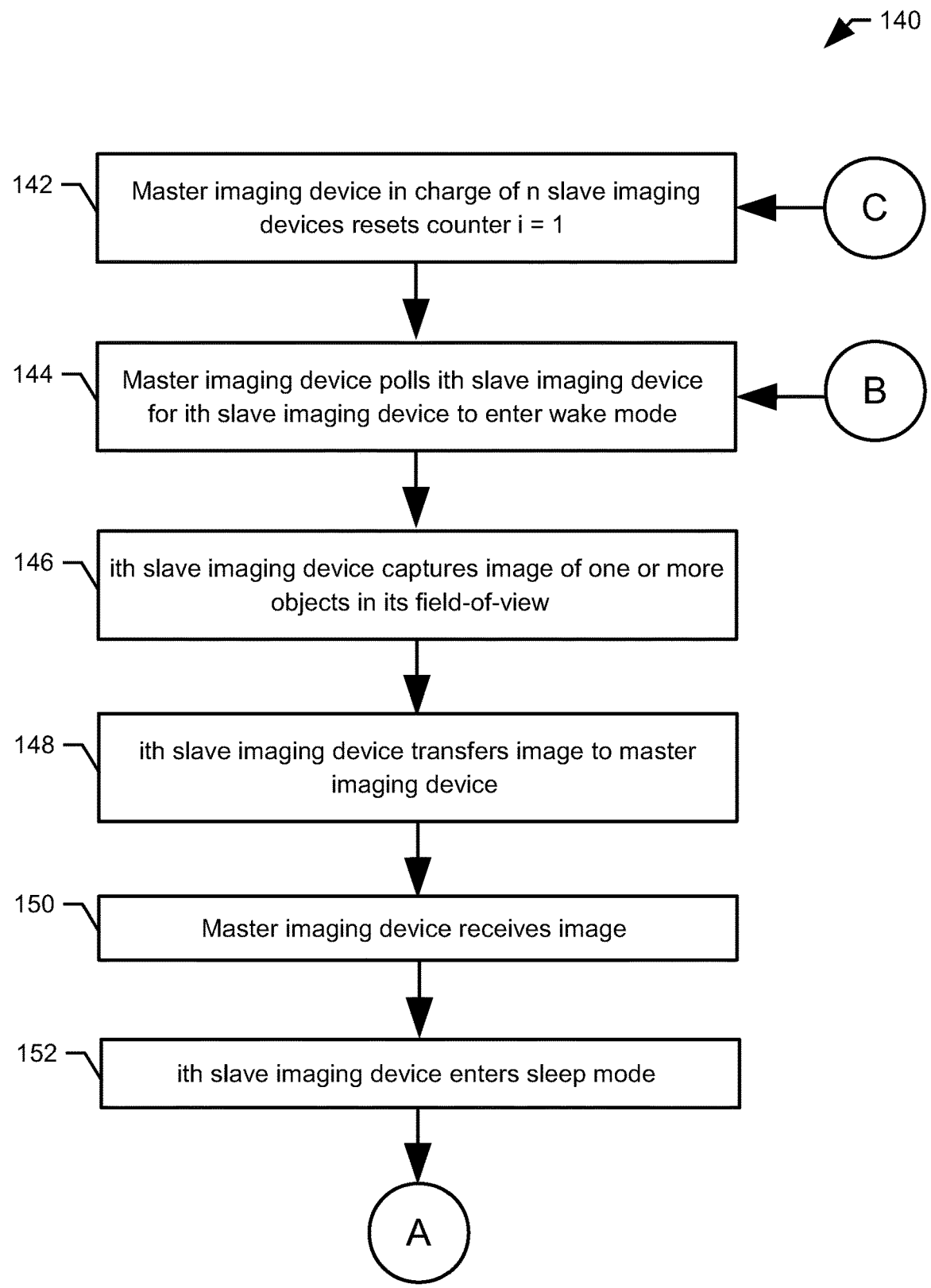
FIGS. 1B and 1C represent a flow diagram depicting an embodiment of the operation of a master imaging device and one or more slave imaging devices.

FIG. 1B is a flow diagram depicting an embodiment 140 of the operation of a master imaging device and one or more slave imaging devices wirelessly coupled to the master imaging device. Initially, at 142, a master imaging device in charge of n slave imaging devices resets a counter to i=1. Next, at 144, the master imaging device polls an $i^{th}$ slave imaging device, where the index i associated with a slave imaging device is associated with counter i. At 146, the $i^{th}$ slave imaging device captures an image of one or more objects in its field-of-view. Next, at 148, the $i^{th}$ slave imaging device transfers the image to the master imaging device using the wireless coupling between the $i^{th}$ slave imaging device and the master imaging device. At 150, the master imaging device receives the image. Next, at 152, the $i^{th}$ slave imaging device enters sleep mode, returning to the low-power state that it was in before being polled by the master imaging device. The method then goes to A, with a continued description in the description of FIG. 1C.

Figure 1C:
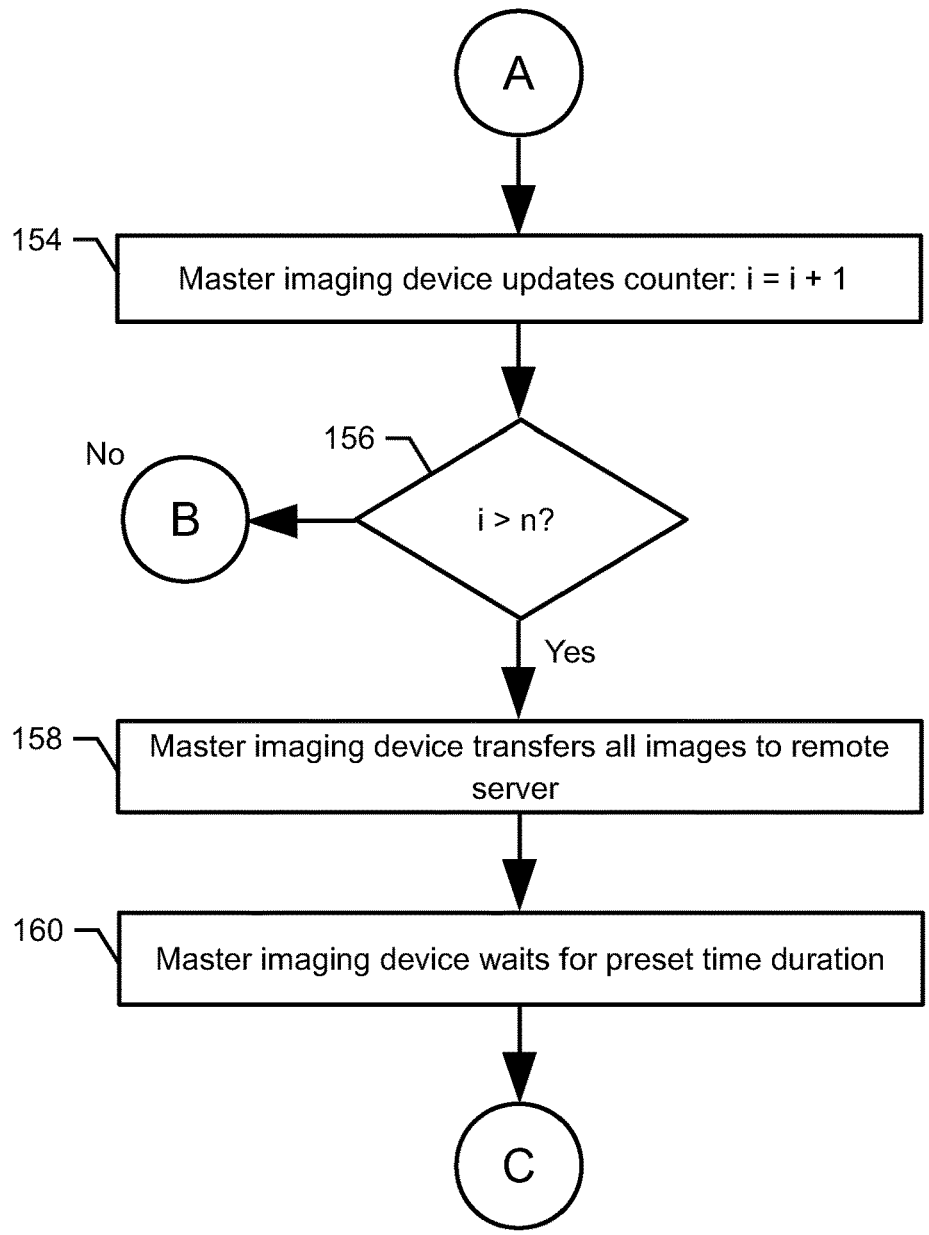

FIG. 1C is a description of the method 140, continued from FIG. 1B. Starting at A, the method proceeds to 154, where the master imaging device updates the counter i=i+1. Next, at 156, the method checks to see whether i>n, i.e. whether all the slave imaging devices in the control of the master imaging device have been serviced. If i<=n, (i.e. if i is less than or equal to n), then there are slave imaging devices remaining to be serviced, and the method goes to B, where it returns back to 144. If at 156 i>n, then all slave imaging devices have been serviced, and the method proceeds to 158, where the master imaging device transfers all the images (i.e. the collection of images from each of the slave imaging devices) to a remote server such as remote server 138. The method proceeds to 160, where the master imaging device waits for a preset time duration before going to C and returning back to 140. Having the master imaging device wait for a preset time duration allows the slave imaging devices to be in sleep mode for a longer duration of time, thereby reducing system power consumption. Furthermore, high speed operation in a retail environment is typically not important. Thus, a time delay between operation sequences can be introduced. Hence, the master imaging device can be prompted to enter sleep mode for a specified amount of time for even further power savings.

Figure 2:
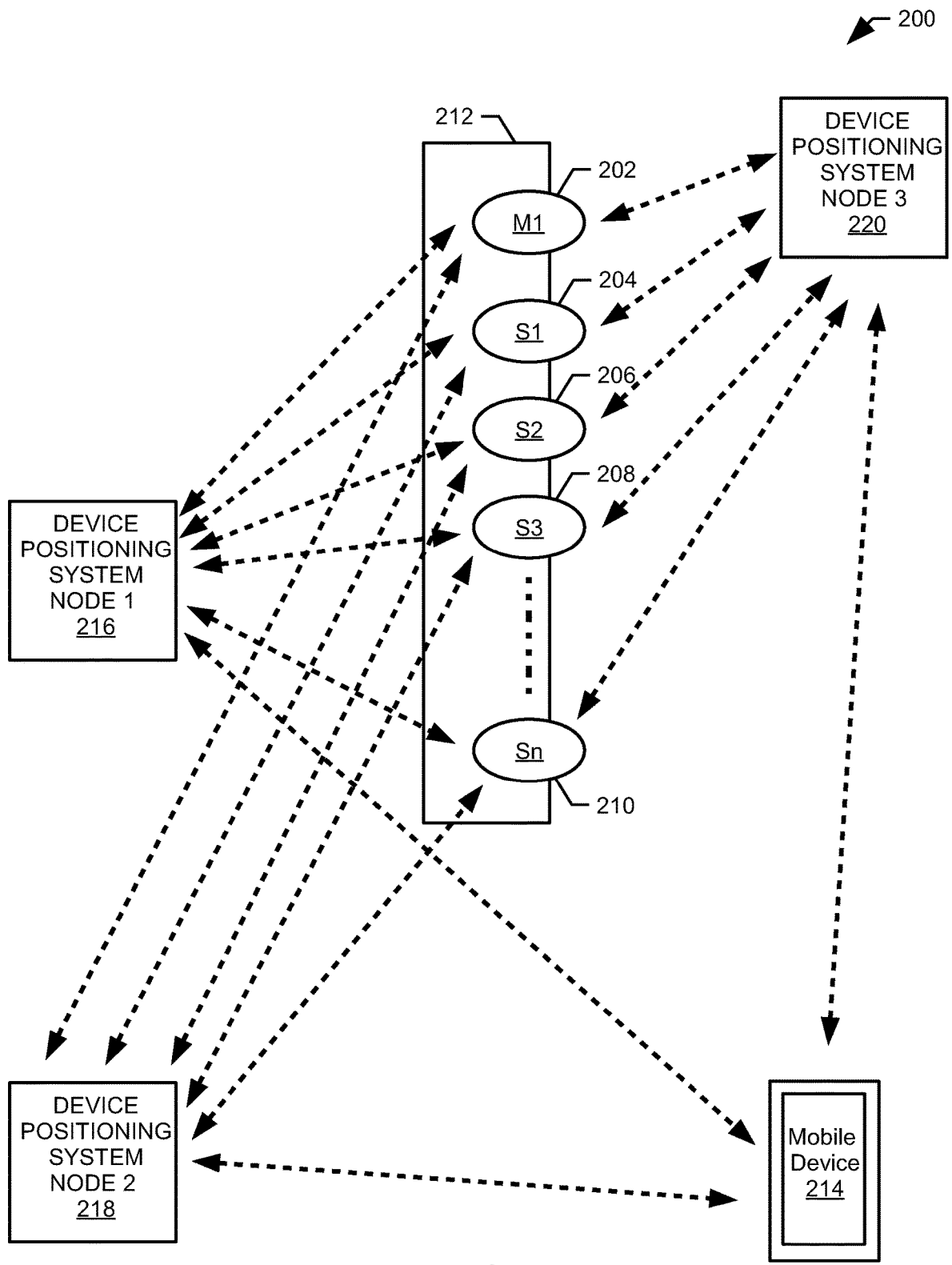
FIG. 2 is a block diagram depicting an embodiment of a device positioning system associated with the inventory management system.

FIG. 2 is a block diagram depicting an embodiment 200 of a device positioning system associated with the inventory management system. In some embodiments, a master imaging device M1 202 is individually wirelessly coupled to a slave imaging device S1 204, a slave imaging device S2 206, a slave imaging device S3 208 and so on, up to a slave imaging device Sn 210. Together master imaging device M1 202 and slave imaging device S1 204 through slave imaging device Sn 210 may be located on a shelf 212 in, for example, an aisle in a store. Note that a remote server such as remote server 138 is not shown in FIG. 2. A device positioning system that includes a device positioning system node 1 216, a device positioning system node 2 218, and a device positioning system node 3 220 are each individually wirelessly coupled with each of master imaging device M1 202 and slave imaging device S1 204 through slave imaging device Sn 210. The device positioning system enables the location of a device wirelessly coupled to the device positioning system to determine a location associated with the device relative to device positioning system node 1 216, device positioning system node 2 218 and device positioning system node 3 220. Thus, each device wirelessly coupled to the device positioning system including master imaging device M1 202 and slave imaging device S1 204 through slave imaging device Sn 210 can each determine their individual locations relative to device positioning system node 1 216, device positioning system node 2 218 and device positioning system node 3 220. The operation of the device positioning system is described in detail herein.

In some embodiments, a mobile device 214 associated with a user that may include store personnel or a customer in the store may also be wirelessly coupled to device positioning system node 1 216, device positioning system node 2 218 and device positioning system node 3 220 of the device positioning system. Mobile device 214 includes any type of computing device, such as smartphones, tablets, smart watches, and the like. The device positioning system can be used by the mobile device 214 to determine the position of the mobile device 214 relative to device positioning system node 1 216, device positioning system node 2 218 and device positioning system node 3 220. If each of the imaging devices master imaging device M1 202 and slave imaging device S1 204 through slave imaging device Sn 210 and mobile device 214 transmits its location as determined by the device positioning system to the remote server such as remote server 138, then the remote server can compute a relative position of mobile device 214 relative to one or more of master imaging device M1 202 and slave imaging device S1 204 through slave imaging device Sn 210, thus implementing an indoor relative navigation system, also known as iGPS (indoor GPS). The system thus enables a user of mobile device 214 to navigate to a desired position or to a desired item in the store. This feature is very useful for navigation in indoor environments, where GPS-based positioning is not possible due to the high attenuation of GPS signals.

In other embodiments, the device positioning system uses a plurality of radio frequency emitting beacons (corresponding, for example, to device positioning system node 1 216, device positioning system node 2 218 and device positioning system node 3 220) transmitting at known locations in a space such as a store. A device wishing to determine its location does so by measuring the received signal strength (RSS), or signal power, from each of the beacons to perform a trilateration calculation that is well-known in the art. In some embodiments, a slave imaging device may transmit its RSS data to the associated master imaging device in the same data packet used to transmit the image file. The master imaging device can then collectively transmit images and RSS values (with the appropriate node or slave imaging device ID), including the image and RSS value corresponding to the master imaging device, to the remote server such as remote server 138. It is important to note that an imaging device, whether a master imaging device or slave imaging device, does not need to transmit its RSS data every time, since the positions of both the master imaging device and slave imaging devices are mostly fixed until the point where the store is remodeled or shelves are moved around. Mobile device 214 can run application software that receives RSS values associated with the master imaging device(s) and associated slave imaging devices to compute a relative location of mobile device 214, while using its own RSS values and corresponding position relative to the device positioning system.

In some embodiments, mobile device 214 can run an application that either runs the positioning algorithm in real-time or transmits the data to the remote server that is configured to run the positioning algorithm and return the relative coordinates of mobile device 214 to mobile device 214. The application running on mobile device 214 can be configured to present the coordinates associated with mobile device 214 over a moving map display to a user, where the map is the current map of the store. If the store layout is changed, the application can be updated in real-time to reflect this change. Both store workers and customers can be alerted accordingly, if necessary. In order to reduce the data transfer to and from the remote server, RSS information can be transmitted to the server only by the master imaging devices, assuming that the relative positions of the slave imaging devices with respect to the master imaging devices do not change.

There are multiple advantages and applications associated with the store-monitoring camera network, especially with the positioning ability built in. A few of these applications are described here.

Merchandise Location and Store Mapping

This application is an extension of the system described above. The location of a customer in the store can be determined using the device positioning system, and this location can be presented to the customer on a moving map display via an application running on the customer's mobile device. The customer can not only navigate through the store, but can also be directed to a specific good or item of interest. The customer can query the item and then be directed with turn-by-turn directions to the item. The map presented to the customer, along with item locations, can be dynamically updated to reflect any changes in the store layout. Bluetooth proximity sensors can be included in the camera or imaging device monitoring the item of interest, and the customer's mobile device can pick up these short-range signals when the customer is in the proximity of the item of interest. Thus, a comprehensive in-store navigation system can be implemented. The store-monitoring camera network now not only provides inventory monitoring, but the system can also be used as an in-store navigation system to assist customers in finding what they are looking for. Enhancements to this basic system are evident. Location-based systems can be used to push advertising to customers as they navigate through the aisles. Or, a customer's purchase history can be used to remind the customer about a particular product they purchased in the past. Enhancements to this basic system are extensive and can include a large number of applications related to the retail space.

In-Store Navigation System for the Blind

The above navigation system can also be extended to assist the blind. Voice directions and haptic feedback can be included in the application running on the mobile device of the visually impaired person to help guide them to the location of interest. Systems to help assist the blind do not necessarily have to be limited to a smartphone realization. For example, smart necklaces, wrist bands and other such wearable devices can be used to realize such an application.

Smart Shopping Cart

Extending the above concepts further, the technology can be incorporated into smart shopping carts, which can be especially useful for the blind. The shopping cart could be enabled with readers that would scan anything around it. Together with the inventory device system, the shopping cart could be guided to the devices and could read radio frequency (RF) sensors, quick response (QR) code readers (improved by full packages printed with QR codes), or other sensor readers that would not need to rely on a smartphone. This could also enable the inventory devices on the shelves to remain low-powered, and the cart could have the battery required to power all of the readers.

The above description of the wireless store-monitoring system can be realized using alternative sensor technologies. For example, RFID-based systems can be used for livestock monitoring. RFID sensors can be embedded under the skin of the animals and interrogated appropriately when the animals are let in and out of their shelter. Each animal can be give a unique identification number, and the animal scans can be appropriately tallied against a roster list, for example.

Infrared, ultraviolet and ultrasound are other modalities that can be used in order to implement the communication links. For example, line-of-sight (LOS) communication links such as the camera-to-camera communication links in each aisle, for example, can be implemented using optical communication links such as infrared or ultraviolet links. Infrared or ultraviolet diodes can act as transmitters, with corresponding infrared or ultraviolet receivers acting as receivers respectively. Similarly, acoustic communication links using ultrasonic transmitter-receiver pairs can also be used for camera-to-camera communication links, for example. Other communication modalities such as lidar and laser-based systems can be used to implement the communication links in alternate embodiments.

Figure 3:
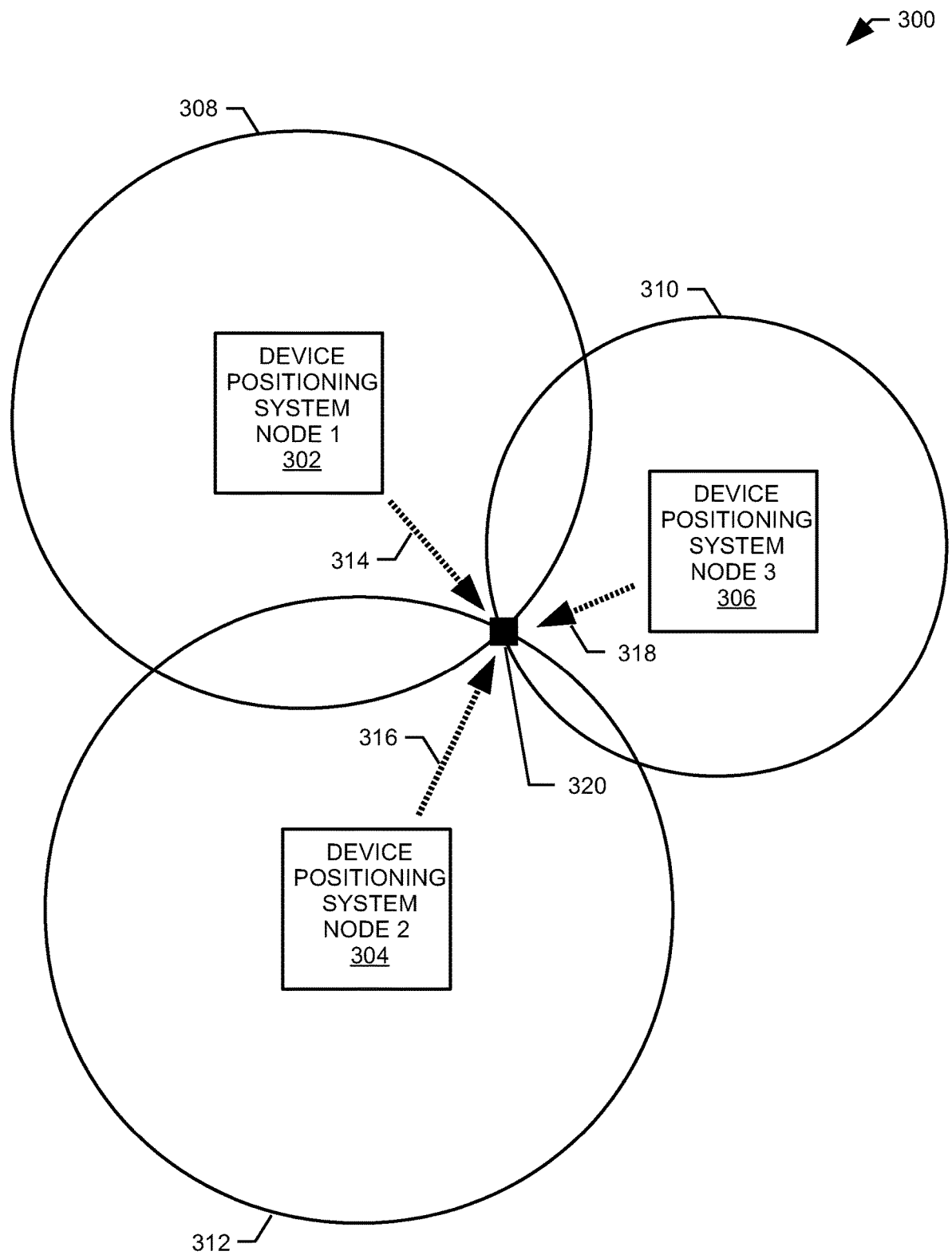
FIG. 3 is a block diagram depicting a basic functionality of a device positioning system.

FIG. 3 is a block diagram depicting a basic functionality of a device positioning system 300. In some embodiments, device positioning system 300 comprises multiple device positioning system nodes. In FIG. 3, three such device positioning system nodes are shown—a device positioning system node 1 302, a device positioning system node 2 304, and a device positioning system node 3 306. In some embodiments, the device positioning system nodes may be independent Wi-Fi network access points, or Wi-Fi routers. In other embodiments, other kinds of wireless communication protocols including but not limited to radio frequency (RF) signal systems, ultrasound systems, or optical systems can be used as the basis for the device positioning system nodes.

For the sake of an example, assume that device positioning system node 1 302, device positioning system node 2 304, and device positioning system node 3 306 are each a Wi-Fi access point. A device such as mobile device 214 at a location 320 receives a distinct Wi-Fi signal from each of device positioning system node 1 302, device positioning system node 2 304, and device positioning system node 3 306. Suppose the respective distances of location 320 from device positioning system node 1 302, device positioning system node 2 304, and device positioning system node 3 306 are $r_1$ 314, $r_2$ 316 and $r_3$ 318. In general, if P is the power received from a device positioning system node at a point at a distance of r from the device positioning system node, then P is proportional to $1/r^2$. Knowing the received power or received signal strength (RSS) at a point from a device positioning system node, it thus becomes possible to compute the corresponding distance of the point from the device positioning system node given that the transmit power of a particular node is known. Now, consider device positioning system node 1 302 as a single operating node. For a received power of $P_1$ at location 320 which is at a distance $r_1$ 314 from device positioning system node 1 302, the location 320 can be located on a sphere of radius $r_1$ 314 with device positioning system node 1 302 at the center of the sphere. Note that we cannot determine the exact coordinates of location 320 in three-dimensional space since we only know the distance $r_1$ 314 of the point location 320 from device positioning system node 1 302, not the angles that include azimuth and elevation. Now, if we add a second device positioning system node, say device positioning system node 2 304, then for a received power level of $P_2$, we can determine the radius of a sphere, $r_2$ 316, on which location 320 lies with respect to device positioning system node 2 304. If device positioning system node 1 302 and device positioning system node 2 204 are present simultaneously, then it is straightforward to see that location 320 lies on both spheres with radii $r_1$ 312 and $r_2$ 314 respectively. From geometry, we see that the two spheres intersect in two points; hence by adding a second transmitter, we have reduced the region of uncertainty in three-dimensional space to two points—location 320 is at either of the two points of intersection of the two spheres. In order to completely resolve this ambiguity, we add a third device positioning system node, device positioning system node 3 306. For a received power level of $P_3$ from device positioning system node 3 306, we have a corresponding radius of $r_3$ 316. Now, we see that all three circles intersect at a point, and we can compute an unambiguous solution for location 320 in three-dimensional space. This process is called trilateration, and the details of the associated mathematics are well-known in the art. Adding more device positioning system nodes can be beneficial to reducing uncertainties associated with noise, along with other channel distortions such as multipath. For more than three device positioning system nodes, the problem becomes one of solving sets of overdetermined sets of equations. Solutions for overdetermined sets of equations are well-known numerical computing recipes that can be implemented on any general processing architecture.

Figure 4:
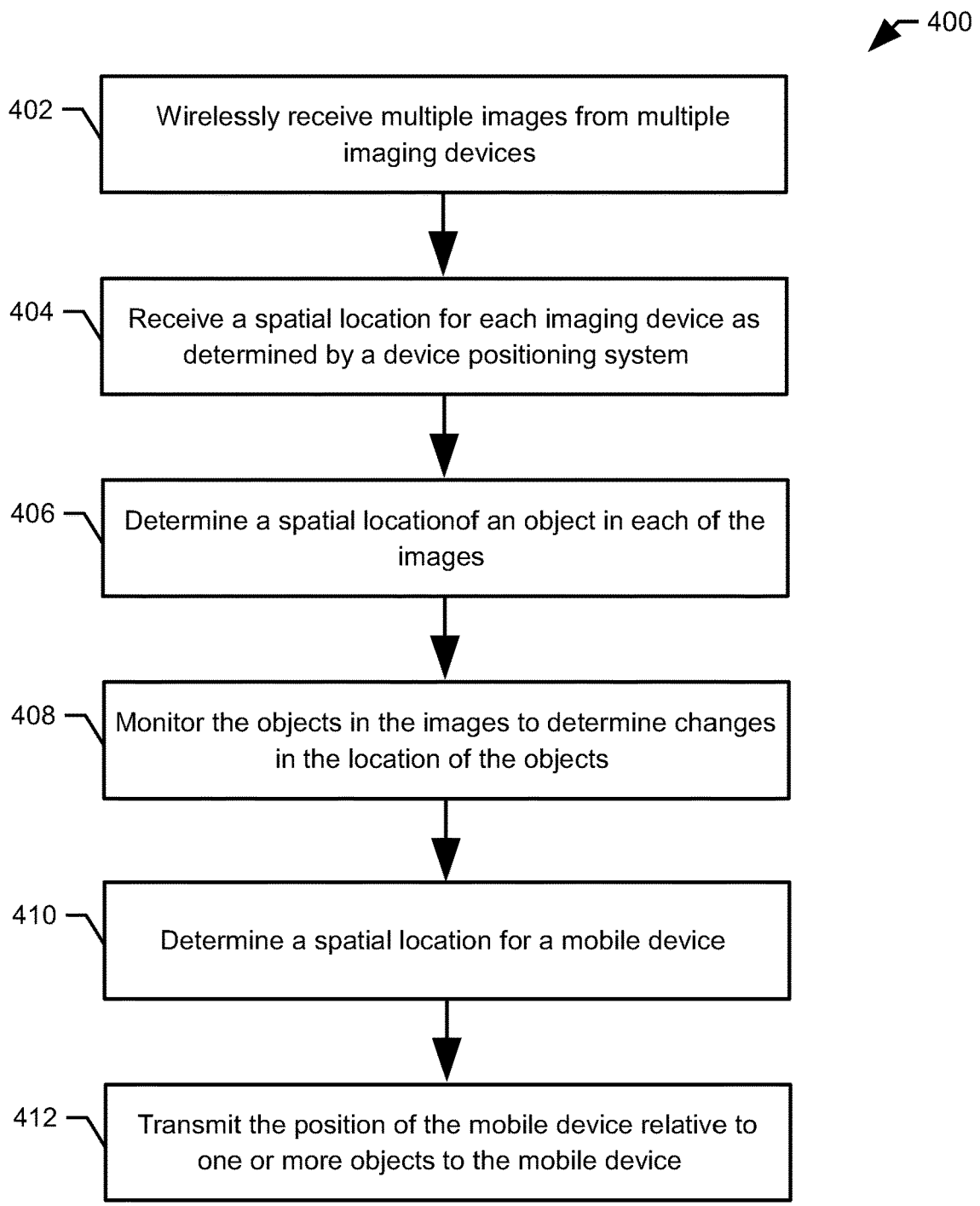
FIG. 4 is a flow diagram depicting an embodiment of a method for monitoring one or more items by the inventory management system, while also providing an indoor positioning system for a user of a mobile device.

FIG. 4 is a flow diagram depicting an embodiment 400 of a method for monitoring one or more items by the inventory management system, while also providing an indoor positioning system for a user of a mobile device. At 402, the method wirelessly receives multiple images from multiple imaging devices, where the multiple imaging devices may be any combination of master imaging devices and associated slave imaging devices. Next, at 404, the method receives a spatial location for each imaging device as determined by a device positioning system. The operation of a representative device positioning system has been described above, and allows each imaging device to determine its location relative to the device positioning system.

At 406, based on the location of an imaging device, the method determines a spatial location of an object (or multiple objects) in each image captured by each imaging device. In some embodiments, the object may be an item on a shelf in a retail store. At 408, the method monitors the objects in the images to determine changes in the location of the objects. This process is useful in determining, for example, on-shelf merchandise inventory or items placed in the wrong location at a store.

The method 400 also provides indoor navigation and positioning features to a mobile device associated with the system. At 410, the method determines a spatial location for a mobile device using, for example, the device positioning system discussed above. Finally, at 412, the method transmits to the mobile device the relative position of the mobile device relative to one or more objects, where the objects may include on-shelf merchandise inventory items. The relative positioning information allows a user of the mobile device to navigate to an object of interest as discussed earlier in the specification.

Figure 5:
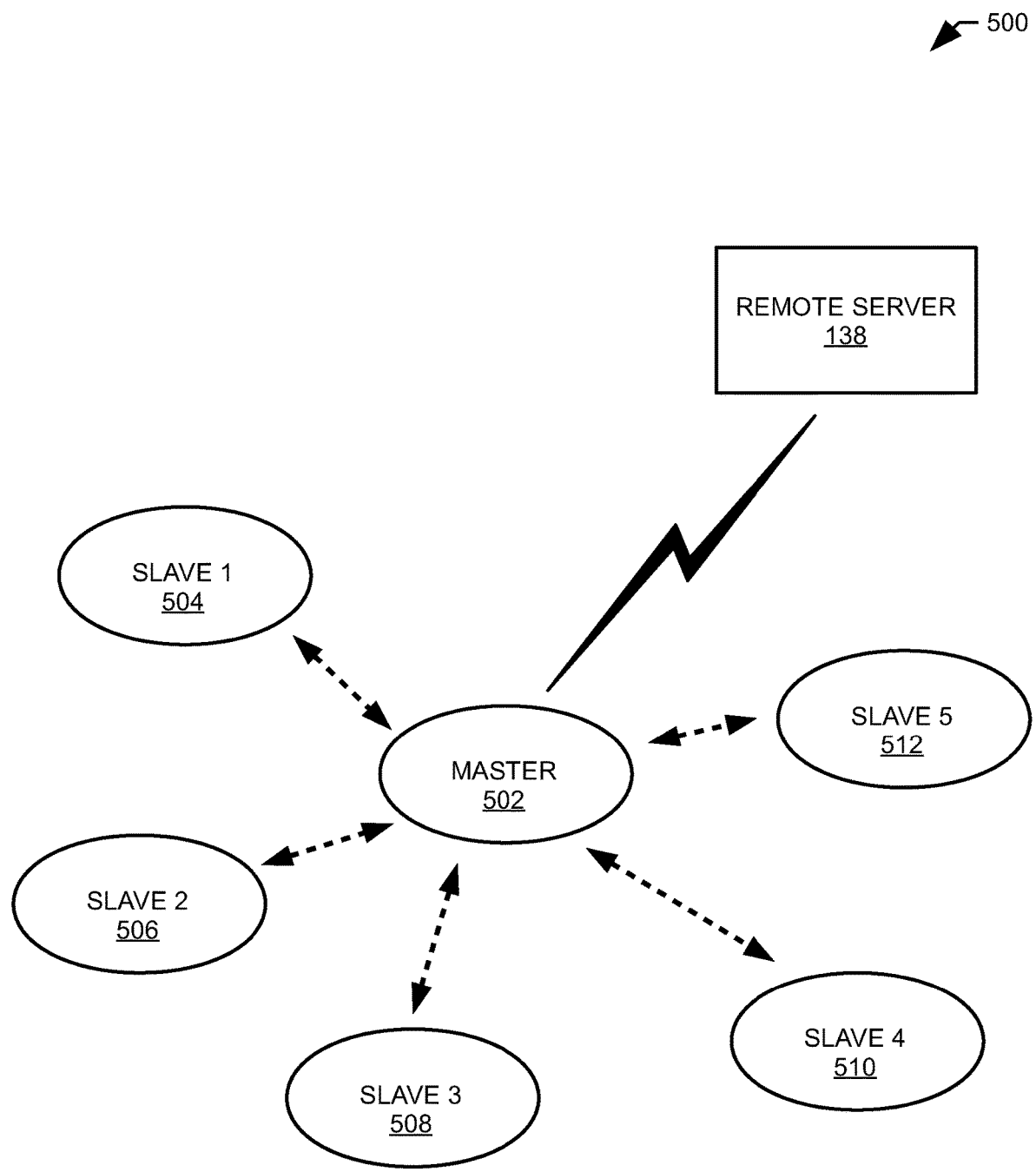
FIG. 5 is a block diagram depicting an embodiment of an architecture used in an implementation of the inventory management system.

FIG. 5 is a block diagram depicting an embodiment 500 of an architecture used in an implementation of the inventory management system. In some embodiments, a master imaging device 502 is wirelessly coupled to a slave imaging device 1 504, a slave imaging device 2 506, a slave imaging device 3 508, a slave imaging device 4 510 and a slave imaging device 5 512 in a star topology as shown in FIG. 5. Master imaging device 502 is also wirelessly coupled to remote server 138. Note that in FIG. 5, one master imaging device and five slave imaging devices are shown as an illustrative example. In alternate embodiments, a larger or lesser number of slave imaging devices may be interfaced with a specific master imaging devices in a star topology depending on the application requirements.

In some embodiments, in a sequence of operations, master imaging device 502 enters a wake mode from a sleep mode, captures an image and transmits this image wirelessly to remote server 138 along with other data that may include position coordinates as determined by an associated device positioning system. Next, master imaging device 502 polls slave imaging device 1 504. Slave imaging device 1 504, upon receiving a polling request from master imaging device 502, enters a wake state from a sleep state, captures an image and transmits this image wirelessly to master imaging device 502 along with other data that may include position coordinates as determined by an associated device positioning system. After transmitting data to master imaging device 502, slave imaging device 1 504 returns to sleep mode. Master imaging device 502 transmits the data received from slave imaging device 1 504 to remote server 138, and then proceeds to poll the next slave imaging device—slave imaging device 2 506, and repeats the process described above, polling and servicing each slave imaging device in a round-robin fashion until all slave imaging devices in the star network have been serviced. After going through the entire cycle of polling all the slave imaging devices and transmitting all data from that cycle to remote server 138, master imaging device 502 may enter sleep mode for a period of time before entering wake mode to repeat the entire process.

In other embodiments, master imaging device 502, upon receiving a data packet (that includes an image and other data) from a slave imaging device, may temporarily store the data packet in local memory rather than transmitting the data packet immediately to remote server 138. Master imaging device 502 may also store its own imaging and other data along with data from all the slave imaging devices in the star network through a single polling cycle, and then transmit all the stored data in one consolidated packet to remote server 138.

Figure 6:
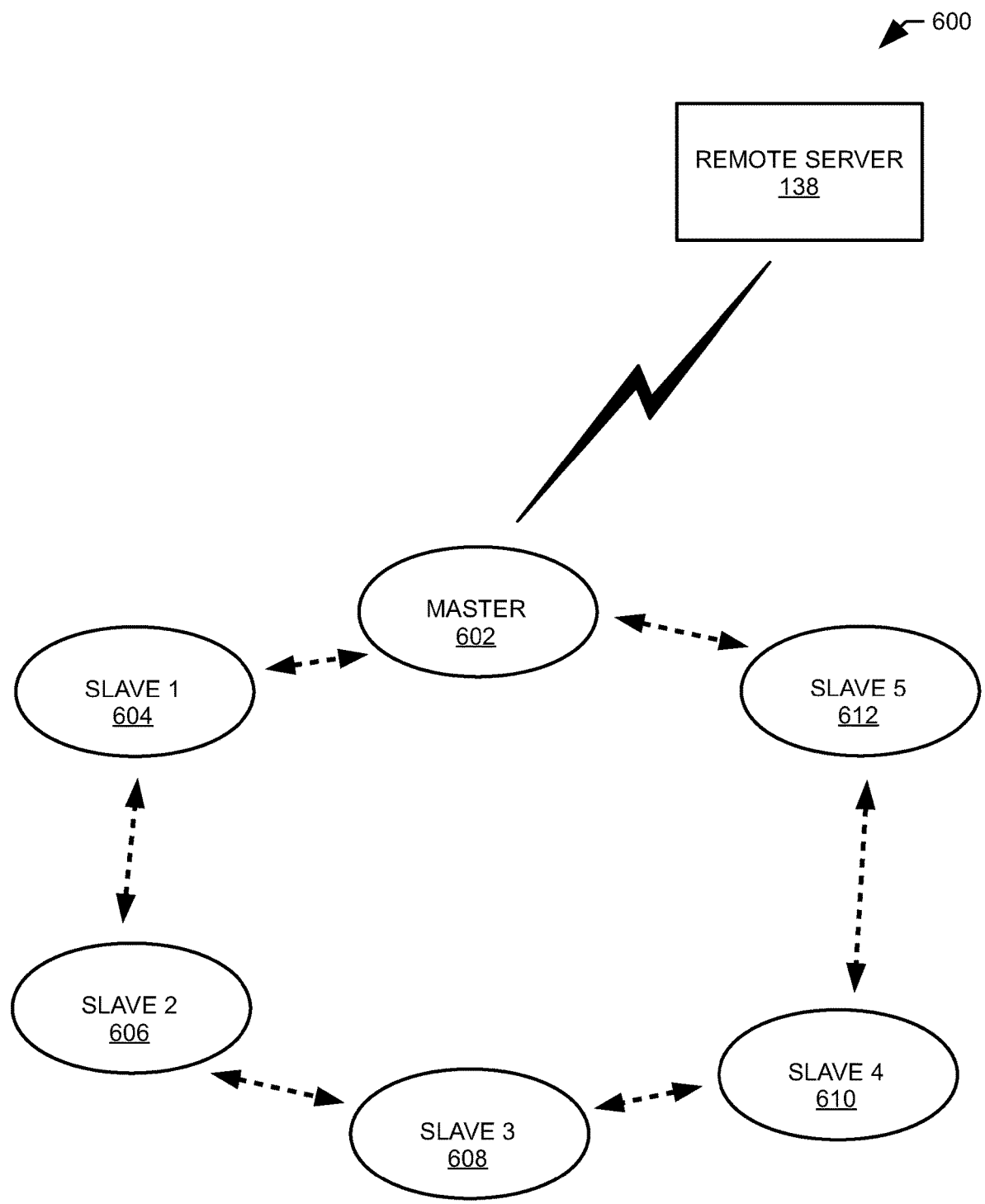
FIG. 6 is a block diagram depicting an embodiment of another architecture used in an implementation of the inventory management system.

FIG. 6 is a block diagram depicting an embodiment 600 of another architecture used in an implementation of the inventory management system. In some embodiments, a master imaging device 602 is wirelessly coupled to a slave imaging device 1 604, a slave imaging device 2 606, a slave imaging device 3 608, a slave imaging device 4 610 and a slave imaging device 5 612 in a ring topology as shown in FIG. 6. Master imaging device 602 is also wirelessly coupled to remote server 138. Note that in FIG. 6, one master imaging device and five slave imaging devices are shown as an illustrative example. In alternate embodiments, a larger or lesser number of slave imaging devices may be interfaced with a specific master imaging devices in a ring topology depending on the application requirements.

In some embodiments, in a sequence of operations, master imaging device 602 enters a wake mode from a sleep mode and concurrently prompts all slave imaging devices to enter a wake mode. The master imaging device 602, slave imaging device 1 604, slave imaging device 2 606, slave imaging device 3 608, slave imaging device 4 610 and slave imaging device 5 612 all simultaneously capture an image of an object in their respective vicinity. Next, master imaging device 602 wirelessly transmits its captured image and other associated data (which may include a node identifier and the position of master imaging device 602 relative to an associated device positioning system) in the form of a data packet to remote server 138. Concurrently, master imaging device 602 reads in a corresponding data packet from slave imaging device 1 604. At the same time, slave imaging device 1 604 reads in a data packet from slave imaging device 2 606, slave imaging device 606 reads in a data packet from slave imaging device 3 608, slave imaging device 3 608 reads in a data packet from slave imaging device 4 610, and slave imaging device 4 610 reads in a data packet from slave imaging device 5 612, where each data packet includes an image captured by the corresponding imaging device and other data that may include a position of the imaging device relative to the associated device positioning system. Next, master imaging device 602 transmits the data packet read in from slave imaging device 2 604 to remote server 138, and reads in the data packet stored on slave imaging device 2 604—this is the data packet originally created by slave imaging device 3 606. Slave imaging device 2 604 reads in the data stored on slave imaging device 3 606—this is the data packet originally created by slave imaging device 4 608. This process continues until all data packets from the master imaging device 602 and all associated slave devices have been transferred to remote server 138. In this way, data is transmitted in a sequential format, propagating through the line of slave imaging devices. We thus have a mechanism that functions as a shift register, where the contents of the different imaging devices in the ring architecture are sequentially shifted out and transmitted to remote server 138 by master imaging device 602.

In some embodiments, once an imaging device completes the data transfer of its data packet and determines that it does not need to pass through any additional data from imaging devices lower down in the chain, that imaging device can enter sleep mode. For example, once slave imaging device 5 612 transfers out its data packet to slave imaging device 4 610 in the first step, slave imaging device 5 612 does not need to perform any more functions for this polling cycle, and can enter sleep mode. Similarly, when slave imaging device 4 610 shifts out the data packet associated with slave imaging device 5 612 in the second step, slave imaging device 4 610 can also enter sleep mode, and so on. The master imaging device 602 is the last to enter sleep mode.

In FIG. 6, the wireless coupling between master imaging device 602 and slave imaging device 5 612 is shown to complete the ring architecture. For a unidirectional shift rule, this wireless coupling is optional. Without this link, the topology reduces to a linear or chain structure that is ideal for implementation on shelves in a retail environment, as discussed subsequently.

Figure 7:
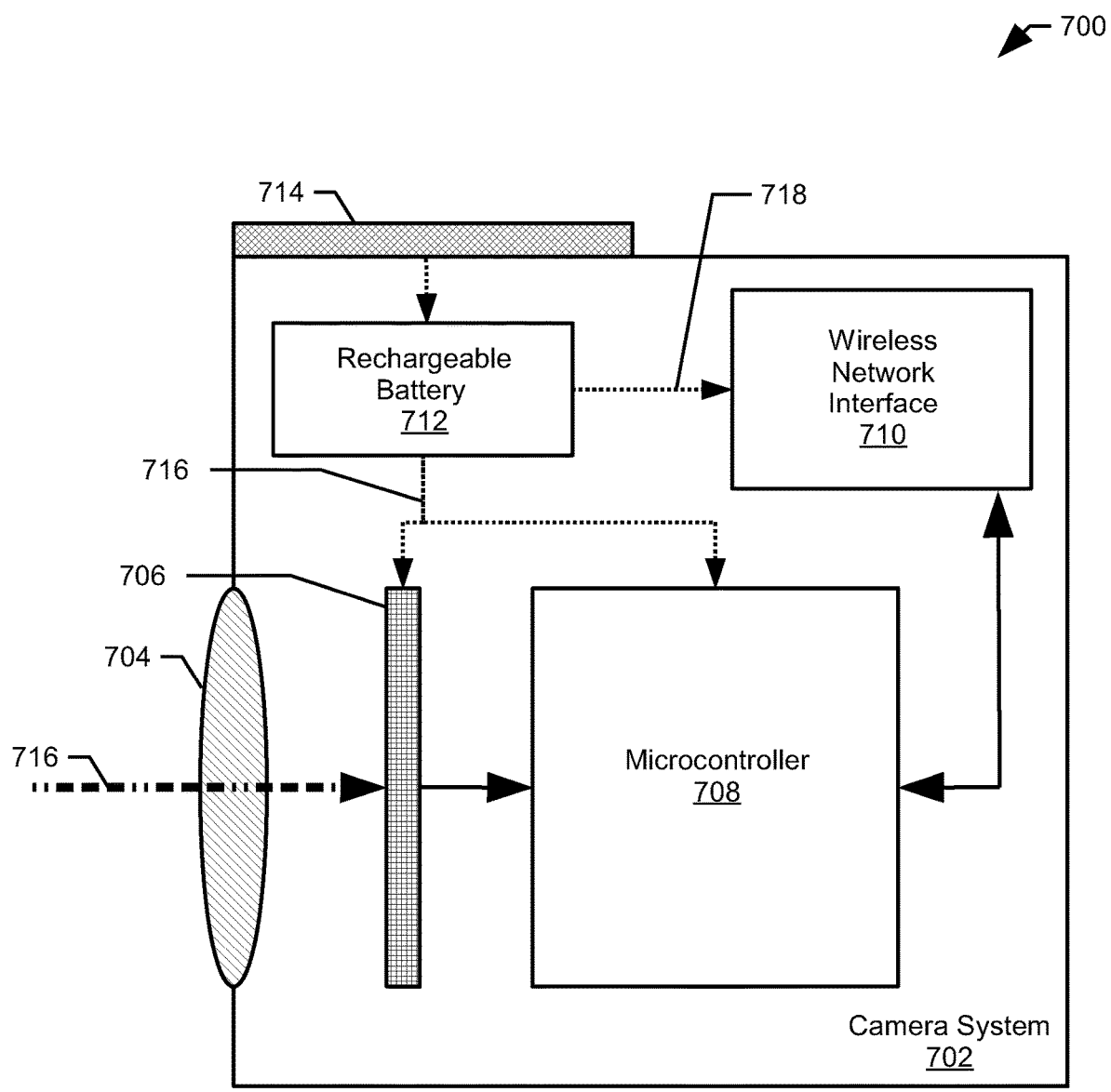
FIG. 7 is a block diagram depicting an embodiment of an imaging device used in the inventory management system.

FIG. 7 is a block diagram depicting an embodiment of an imaging device used in the inventory management system. In some embodiments, an imaging device may be implemented using a camera system 702. Camera system 702 may have an optical lens 704, used to collect and focus light onto an image sensor 706. Optical lens 704 is optically coupled to an image sensor 706. In other embodiments, optical lens 704 may be replaced by a pinhole (not shown). The advantage of a pinhole over an optical lens such as optical lens 704 is that a pinhole does not require any lens elements or focusing mechanism, thus making the camera system 702 lighter and less structurally complex. Furthermore, a pinhole offers a large depth-of-field due to the relatively small aperture, and renders a large spatial range in focus. A clear, fixed glass element can be used as a cover for the pinhole in order to prevent dust from entering into camera system 702 and settling on image sensor 706. The disadvantage of a pinhole is that the relatively small aperture results in less light entering the camera and hitting image sensor 706. Using optical lens 704 serves to brighten the image rendered on image sensor 706, possibly at the expense of higher power consumption (especially if a focusing mechanism is employed) and also at a higher unit cost associated with camera system 702.

Image sensor 706 is electrically coupled to a microcontroller 708. Microcontroller 708 performs multiple functions, including, but not limited to, triggering image sensor 706 to capturing an image, performing image processing operations such as Bayer demosaicing and image compression, as well as implementing all the communication protocols. Microcontroller 708 is interfaced with a wireless network interface 710, where wireless network interface 710 includes one or more interfaces to implement the wireless networking protocols discussed above, including Wi-Fi, ZigBee and Bluetooth. Wireless network interface 710 couples camera system 702 to remote server 138, a device positioning system such as that depicted in FIG. 2, and other imaging devices (master imaging device and/or slave imaging device). Wireless network interface 710 is used to send and receive data, control and communication signals.

In some embodiments, electrical power to camera system 702 is provided by a rechargeable battery 712, which may be charged using ambient lighting via a solar panel 714. Electrical power is distributed within camera system 702 using an electrical coupling 716 and an electrical coupling 718. In other embodiments, rechargeable battery 712 may be wirelessly charged via a microwave signal generated in the proximity of rechargeable battery 712 (for example, via an RF antenna attached to the ceiling of the retail store). An RF antenna (not shown) mounted on camera system 702 may be configured to receive the charging signal and use this signal to charge rechargeable battery 712.

Figure 8:
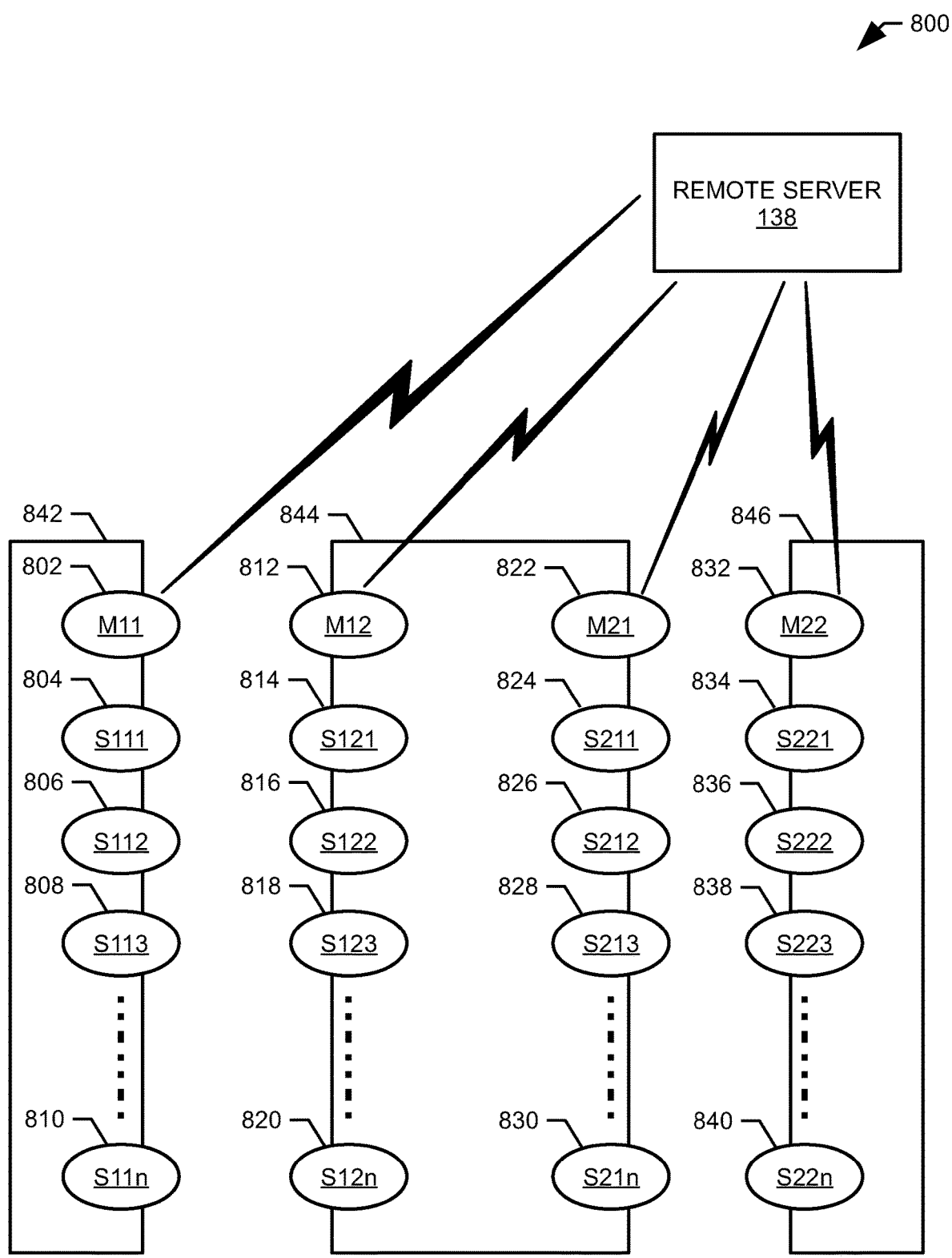
FIG. 8 is a block diagram depicting an embodiment of the inventory management system as implemented on multiple aisles in a retail environment.

FIG. 8 is a block diagram depicting an embodiment 800 of the inventory management system as implemented on multiple aisles in a retail environment. In some embodiments, multiple master imaging devices and slave imaging devices are installed on a shelf 842, a shelf 844 and a shelf 846, where shelf 842, shelf 844 and shelf 846 may be shelves used to store items on display in a retail environment. On shelf 842, a master imaging device M11 802 may be wirelessly coupled to associated slave imaging devices—a slave imaging device S111 804, a slave imaging device S112 806, a slave imaging device S113 808 and so on through a slave imaging device S11n 810. These slave imaging devices may be individually wirelessly coupled with master imaging device M11 802 via interfaces that may include the ring and star topologies discussed earlier in this specification. Master imaging device M11 802 may be wirelessly coupled to remote server 138.

In some embodiments, the cluster of imaging devices comprising master imaging device M11 802, slave imaging device S111 804, slave imaging device S112 806, slave imaging device S113 808 and so on through slave imaging device S11n 810 may be each be oriented such that the respective imaging device captures a specific object in its field-of-view, where the object is located on shelf 844. The images captured by the imaging devices located on shelf 842 may be used to monitor objects located on shelf 844 using the techniques described earlier in this specification. Similar master-slave architectures can be found on shelf 844—a master imaging device M12 812 wirelessly coupled to associated slave imaging devices—a slave imaging device S121 814, a slave imaging device S122 816, a slave imaging device S123 818 and so on through a slave imaging device S12n 820, with master imaging device M12 812 being wirelessly coupled to remote server 138. This cluster of imaging devices is configured to capture images of objects to be monitored on shelf 842, as seen in FIG. 8. Shelf 844 may also have a second set of imaging devices—a master imaging device M21 822 wirelessly coupled to associated slave imaging devices—a slave imaging device S211 824, a slave imaging device S212 826, a slave imaging device S213 828 and so on through a slave imaging device S21n 830, with master imaging device M21 822 being wirelessly coupled to remote server 138. This cluster of imaging devices is configured to capture images of objects to be monitored on shelf 846, as seen in FIG. 8. A similar structure is also seen on shelf 846—a master imaging device M22 832 wirelessly coupled to associated slave imaging devices—a slave imaging device S221 834, a slave imaging device S222 836, a slave imaging device S223 838 and so on through a slave imaging device S22n 840, with master imaging device M21 832 being wirelessly coupled to remote server 138. This cluster of imaging devices is configured to capture images of objects to be monitored on shelf 844, as seen in FIG. 8.

While FIG. 8 shows rows of configurations in two dimensions including master imaging devices and slave imaging devices with a terminal point of each row being a master imaging device, this structure can be extended to three dimensions, to cover items stacked in vertical rows on a shelf. Each row on a shelf can have a row of master imaging device(s) wirelessly coupled to corresponding slave imaging devices to provide comprehensive item monitoring for retail merchandise.

In some embodiments, each intranetwork of the master imaging device/slave imaging device topologies can be interfaced via a suitable wireless protocol such as ZigBee (IEEE 802.15.4). ZigBee is a very versatile, low-power wireless network protocol that supports multiple topologies such as the star and ring topologies discussed earlier. The ZigBee protocol also supports low-power sleep modes. Each master imaging device on each shelf is wirelessly connected to remote server 138, via a suitable wireless link such as Wi-Fi (IEEE 802.11). As seen in FIG. 8, we thus have a matrix of imaging device nodes, where each imaging device node represents an entry in the matrix.

During system operation, each imaging device monitors an item on the opposite shelf. All slave imaging devices in an intranetwork (cluster) stay in sleep mode until awoken by the respective master imaging device on that shelf. At that time, each slave imaging device (as well as the corresponding master imaging device) captures an image of an item on the shelf. The collection of images is then transferred to remote server 138 via the corresponding master imaging device using one or any combination of the protocols described previously. After an imaging node completes its assigned transfer, it enters sleep mode. The entire cycle of wake-capture-sleep is repeated periodically at a predetermined repeat rate, thus ensuring that the repository of images that represent the stock of the current inventory on the sales floor is refreshed with updated information.

Additional system architectures are also possible. For example, only one imaging master device (for convenience, let us call this the "grand master" imaging device) may be connected to remote server 138. Other master imaging devices, upon receiving their quota of files, transfer their respective quotas to the grand master imaging device. The grand master imaging device is then responsible for uploading all image files to remote server 138. The advantage of this architecture is that it reduces the number of wireless connections between master imaging devices and remote server 138, with the downside that file transfer now takes longer since only one wireless link is being used for data transfer to remote server 138.

The continuous stream of images transferred to the remote server can be used to monitor the inventory on the store shelves. At the end of each stock of merchandise monitored by a specific camera or imaging device, a placard displaying a known pattern can be placed. Software running on the remote server can compare the images received from this camera or imaging device with the a priori known pattern and if a match is detected, the item can be flagged as being out of stock. This is a much more effective way of keeping stock of inventory, saving a significant number of man-hours that would normally be devoted to this task. Furthermore, this system can also be used to detect misplaced inventory. For example, if a customer picks up an item from a particular aisle only to change his or her mind later on elsewhere in the store and if the customer places the unwanted item in the wrong location, the image captured by the associated wireless imaging device at the latter location will change from the earlier set of images. In this way, the wirelessly networked imaging device system can identify the location of the misplaced item and alert the store personnel accordingly. This further helps in maintaining in-store merchandise presentation (assuring that a lesser number of items are misplaced) as well as stock-keeping.

Fault detection and identification is an area that needs to be studied for this class of systems. Given a complex nodal structure as described above, it is possible that sometimes one or more nodes may stop working, for reasons that include battery failure or physical damage. Routine polling as, for example, done in ZigBee networks can be used to isolate failed nodes. If each node is assigned a unique ZigBee node ID, for instance, then fault detection and identification becomes a straightforward task. Each master imaging device can be responsible for fault detection and isolation associated with the node that it is assigned to, while the grand master imaging device can be responsible for the group of master nodes. Any detected faults can be flagged as alerts and transmitted to remote server 138 for inspection.

Some embodiments of the inventory management system do not implement the master-slave architecture for the imaging devices. Rather, each device functions as a stand-alone subcomponent of the inventory management system, and individually reports to remote server 138. Remote server 138 can be configured to poll each imaging device in a preset order, at which time the corresponding imaging device enters wake mode, captures an image of the object being monitored, wirelessly transmits the image to remote server 138, and returns to sleep mode. Thus, all synchronization and timing is managed by remote server 138, and the collection of imaging devices constitutes a distributed system with multiple nodes, where each node corresponds to an imaging device.

Figure 9A:
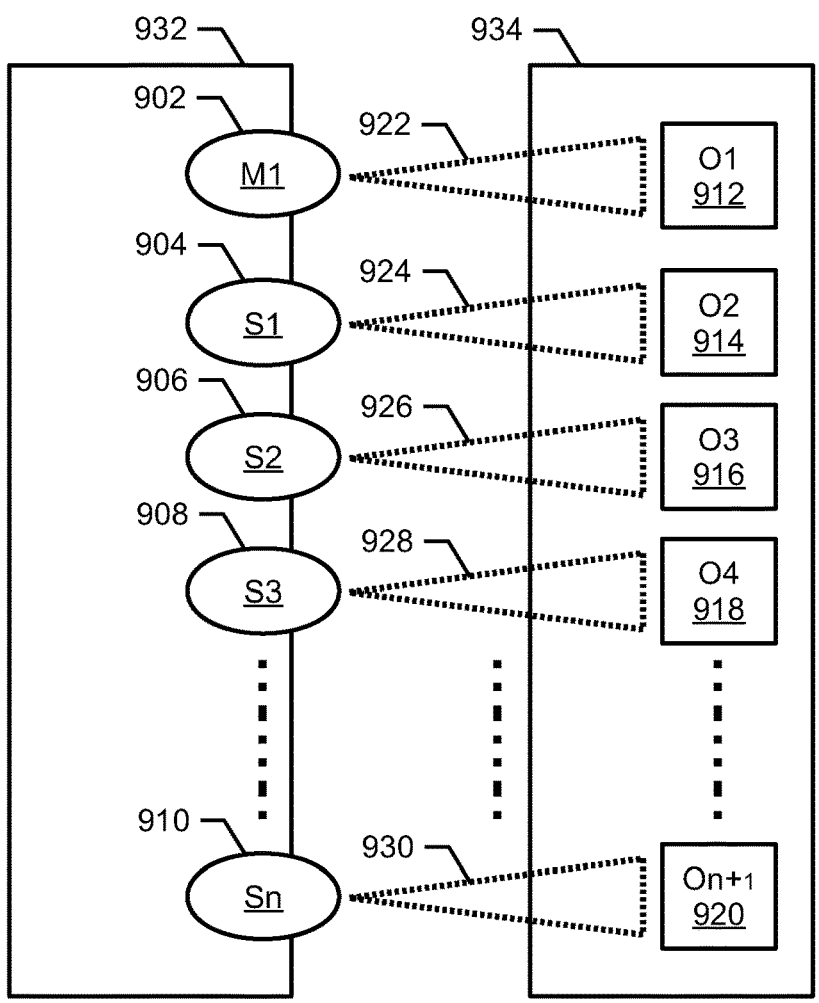
FIG. 9A is a block diagram depicting an embodiment of the inventory management system that includes multiple imaging devices located on a first shelf monitoring one or more objects located on a second shelf.

FIG. 9A is a block diagram depicting an embodiment 900 of the inventory management system that includes multiple imaging devices located on a first shelf monitoring one or more objects located on a second shelf. In some embodiments, a master imaging device M1 902 is wirelessly coupled to multiple slave imaging devices—a slave imaging device S1 904, a slave imaging device S2 906, a slave imaging device S3 908, and so on through a slave imaging device Sn 910. Master imaging device M1 902 is also wirelessly coupled to remote server 138. Master imaging device M1 902 and slave imaging device S1 904 through slave imaging device Sn 910 are located on a first shelf 932, where first shelf 932 may be located in a brick-and-mortar retail store. A second shelf 934 is located opposite first shelf 932, and an object O1 912, an object O2 914, an object O3 916, an object O4 918 through an object $On_{+1}$ 920 are located on second shelf 934, such that object O1 912 is in a field-of-view 922 of master imaging device M1 902, object O2 914 is in a field-of-view 924 of slave imaging device S1 904, object O3 916 is in a field-of-view 926 of slave imaging device S2 906, object O4 918 is in a field-of-view 928 of slave imaging device S3 908, and so on to include all imaging devices and objects respectively located on first shelf 932 and second shelf 934, with object $On_{+1}$ 920 being in a field-of-view 930 of slave imaging device Sn 910. (Note that for clarity, the objects on first shelf 932 and the corresponding imaging devices on second shelf 934 are not shown.) Each imaging device captures images of the object in its field of view. In some embodiments, an object as denoted by, for example, object O1 912 may be a group of multiple objects being monitored by the associated imaging device (in this case master imaging device M1 902). The combination of master imaging device M1 902 and slave imaging device S1 904 through slave imaging device Sn 910 operates in accordance with the previous discussion regarding of the inventory management system.

Figure 9B:
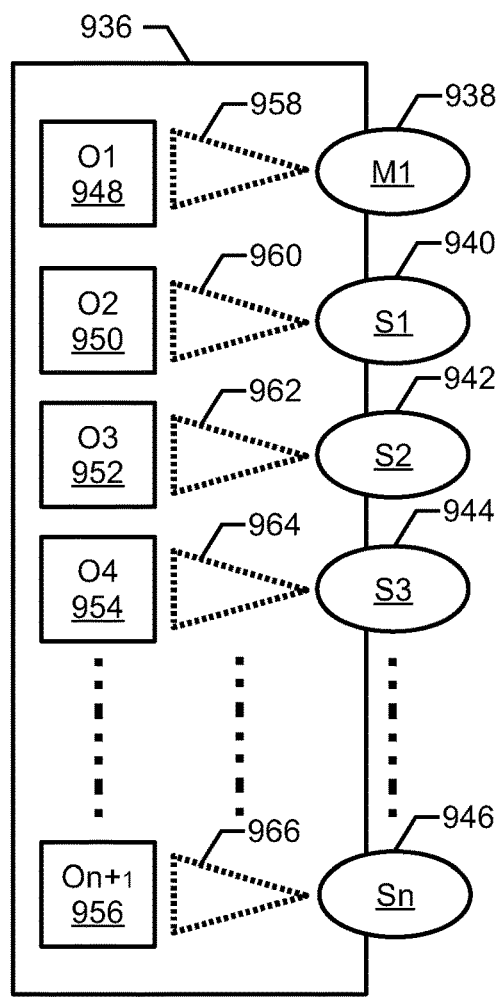
FIG. 9B is a block diagram depicting an embodiment of the inventory management system that includes multiple imaging devices located on a shelf monitoring one or more objects located on the same shelf.

FIG. 9B is a block diagram depicting an embodiment 935 of the inventory management system that includes multiple imaging devices located on a shelf monitoring one or more objects located on the same shelf. In some embodiments, a master imaging device M1 938 is wirelessly coupled to multiple slave imaging devices—a slave imaging device S1 940, a slave imaging device S2 942, a slave imaging device S3 944, and so on through a slave imaging device Sn 946. Master imaging device M1 938 is also wirelessly coupled to remote server 138. Master imaging device M1 938 and slave imaging device S1 940 through slave imaging device Sn 946 are located on a shelf 936, where shelf 936 may be located in a brick-and-mortar retail store. An object O1 948, an object O2 950, an object O3 952, an object O4 954 through an object $On_{+1}$ 956 are located on shelf 936, such that object O1 948 is in a field-of-view 958 of master imaging device M1 938, object O2 950 is in a field-of-view 960 of slave imaging device S1 940, object O3 952 is in a field-of-view 962 of slave imaging device S2 942, object O4 954 is in a field-of-view 964 of slave imaging device S3 944, and so on to include all imaging devices and objects respectively located on shelf 936, with object $On_{+1}$ 956 being in a field-of-view 966 of slave imaging device Sn 946. Each imaging device captures images of the object in its field of view. In some embodiments, an object as denoted by, for example, object O1 948 may be a group of multiple objects being monitored by the associated imaging device (in this case master imaging device M1 938). The combination of master imaging device M1 938 and slave imaging device S1 940 through slave imaging device Sn 946 operates in accordance with the previous discussion regarding of the inventory management system.

The embodiment depicted in FIG. 9B has the advantage that if a cluster of imaging devices is configured to monitor objects on the same shelf as shown in FIG. 9B, the configuration is independent of the location and geometry of other shelves. The operation of such a configuration is unaffected if, for example, shelves are moved around or if an opposite shelf is absent. In contrast, the embodiment depicted in FIG. 9A is dependent on the location and geometry of an opposite shelf, is affected when shelves are moved around, and cannot function in the absence of an opposite shelf.

Figure 10:
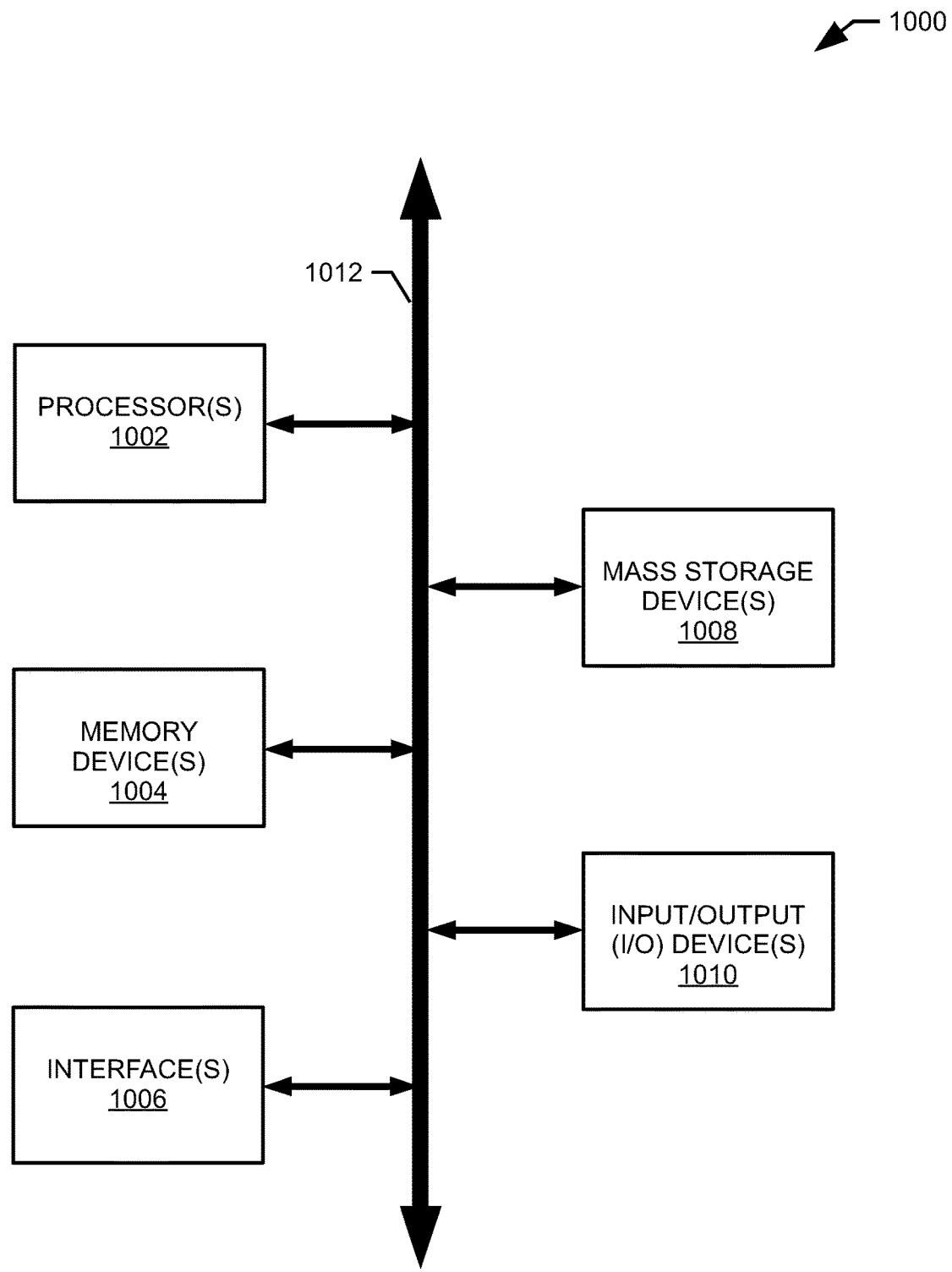
FIG. 10 is a block diagram that depicts a generalized processing architecture that can be used to implement the inventory management system and other systems and components discussed herein.

FIG. 10 is a block diagram that depicts a generalized processing architecture 1000 that can be used to implement the inventory management system and other systems and components discussed herein. Embodiments of the present invention can be implemented using a generalized processing architecture that includes one or more processors 1002, one or more memory devices 1004, one or more interfaces 1006, one or more mass storage devices 1008, and one or more input/output devices 1010, wherein all the different components that comprise the system are interfaced via a centralized bus 1012.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
receiving, by a computing system, a plurality of images captured by a plurality of clusters, wherein each cluster includes one master imaging device and a plurality of slave imaging devices;
controlling, by each master imaging device in each cluster, at least one slave imaging device in the cluster, wherein each master imaging device in each cluster is wirelessly coupled to the computing system, and wherein controlling includes:
polling, by the master imaging device in each cluster, the at least one slave imaging device in the cluster to enter a wake mode;
upon detecting polling of the at least one slave imaging device by the master imaging device, performing by the at least one slave imaging device, waking up, capturing at least one image, returning the at least one image to the master imaging device, and returning to a sleep mode; and receiving, by the master imaging device in each cluster, the at least one image from the at least one slave imaging device in the cluster;

receiving, by the computing system, a spatial location of each imaging device as determined by an indoor positioning system;

determining a spatial location of an object in each of the plurality of images;

monitoring, by the computing system, the objects in the images to determine changes in the location of the objects, determining, by the computing system, that a product in an inventory is out of stock in accordance with the monitoring of the objects in the images; and generating, by the computer system, an alert in response to determining that the product is out of stock.

2. The method of claim 1, wherein the plurality of imaging devices are wirelessly coupled in a star topology.

3. The method of claim 1, wherein the plurality of imaging devices are wirelessly coupled in a ring topology.

4. The method of claim 1, wherein at least one imaging device is powered by ambient indoor lighting.

5. The method of claim 1, further comprising receiving a spatial location of a mobile device wirelessly coupled to the indoor positioning system.

6. The method of claim 5, further comprising determining a spatial position of the mobile device relative to the object.

7. The method of claim 6, further comprising wirelessly transmitting the spatial position of the mobile device relative to the object to the mobile device.

8. The method of claim 7, wherein a user associated with the mobile device uses the spatial position of the mobile device relative to the object to navigate to the object.

9. An apparatus comprising:

a plurality of clusters, wherein each cluster includes one master imaging device and a plurality of slave imaging devices, wherein each master imaging device in each cluster is configured to poll at least one slave device in the cluster to enter a wake mode, and wherein the master imaging device in each cluster is configured to receive at least one image from the at least one slave imaging device in the cluster;

an indoor positioning system wirelessly coupled to the plurality of imaging devices and configured to determine a spatial location of each imaging device; and a computing system wirelessly coupled to each of the master imaging devices and the indoor positioning system, wherein the computing system is configured to receive a plurality of images from the clusters and configured to receive the spatial location of each imaging device from the indoor positioning system, wherein the computing system is further configured to determine a spatial position of an object in each of the plurality of images, and wherein the computer system is configured to:

monitor the objects in the images to determine changes in the location of the objects;

determine that a product is out of stock from the objects not including an instance of the product; and in response to determining that the product is out of stock, generate an alert.

10. The apparatus of claim 9, wherein the plurality of imaging devices are wirelessly coupled in a star topology.

11. The apparatus of claim 9, wherein the plurality of imaging devices are wirelessly coupled in a ring topology.

12. The apparatus of claim 9, wherein each slave imaging device in each cluster is programmed to:

remain in a sleep mode until awoken by the master imaging device of the each cluster;

in response to a wake signal from the master device, transmit image data to the master imaging device of the each cluster followed by returning to the sleep mode.

13. The apparatus of claim 9, wherein at least one imaging device is powered by ambient indoor lighting.

14. The apparatus of claim 9, wherein a mobile device is wirelessly coupled to the indoor positioning system.

15. The apparatus of claim 14, wherein the indoor positioning system determines a spatial position of the mobile device relative to the objects.

16. The apparatus of claim 15, wherein the spatial position of the mobile device relative to the objects is transmitted to the mobile device.

17. The apparatus of claim 16, wherein a user associated with the mobile device uses the spatial position of the mobile device relative to the objects to navigate to the objects.

18. The apparatus of claim 9, wherein the plurality of imaging devices are located on a first shelf and the objects are located on a second shelf.

19. The apparatus of claim 9, wherein the plurality of imaging devices and the objects are located on a same shelf.

* * * * *